Figure 1:
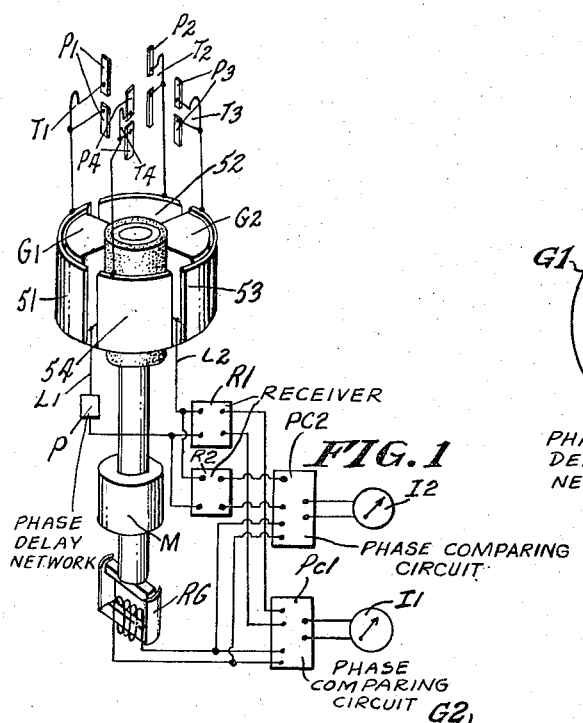

March 24, 1959  D. W. G. BYATT  2,879,506
RADIO DIRECTION FINDERS
Filed Oct. 9, 1952

INVENTOR:
Dennis William George Byatt
BY HIS ATTORNEYS:
Baldwin & Wight

United States Patent Office 2,879,506
Patented Mar. 24, 1959

2,879,506
RADIO DIRECTION FINDERS

Dennis William George Byatt, Chignal, Chelmsford, England, assignor to Marconi's Wireless Telegraph Company Limited, London, England, a British company Application October 9, 1952, Serial No. 313,975

Claims priority, application Great Britain October 31, 1951

9 Claims. (Cl. 343—118)

This invention relates to radio direction finders and has for its object to provide improved and simplified radio direction finders adapted directly to indicate the sense and direction of an incoming signal without requiring the use of an open aerial for sense finding.

A well known form of radio direction finder comprises two mutually perpendicular pairs of aerial elements, for example two mutually perpendicular pairs of dipoles, the dipoles of each pair being spaced apart by approximately a quarter of a wave length or less, and a radiogoniometer of any known type, e.g. a capacity radiogoniometer or an inductance radiogoniometer, the rotor of which is rotated and the rotor output of which is fed to a suitable indicator. Such a system gives two null points in each 360° of rotation of the rotor i.e. for any incoming signal direction there are two positions of said rotor, 180° apart, at which the output is (theoretically) zero. Incoming signal direction is, therefore, indicated but sense is not, i.e. there is an ambiguity of 180°. In order, as is usually required, to eliminate this ambiguity, an open aerial or its equivalent is provided, the effect of which is to translate the rotating figure of eight polar diagram given by the pairs of dipoles and the radiogoniometer combination into a rotating cardioid diagram. The present invention provides improved systems in which the rotating figure of eight diagram is changed into a rotating cardioid diagram without the need of an open aerial or its equivalent.

According to this invention in its broadest aspect a radio direction finding system comprises two mutually perpendicular pairs of aerial elements; an associated radiogoniometer; a receiver, means providing an asymmetrical input to said receiver from the output of said radiogoniometer; means for producing an alternating voltage of datum or reference phase, and an indicator responsive to the phase difference between the receiver output and the reference phase.

There are two broad ways of providing the asymmetry of input. One is by the insertion of phase delay means in one of the output leads of the radiogoniometer rotor or equivalently in the radiogoniometer itself. The other, and preferred way is to unbalance the two halves of the rotor with respect to one another.

A defect which accompanies the use of phase delay means in one of the output leads of the rotor or equivalently in the radiogoniometer itself is that this causes undesired dependence of the sensitivity of the system upon frequency. Thus in one example experimentally tested it was found that variations of pick-up amounting to as much as 10 db (when the receiver is tuned to equi-field strength signals) occurred in a received frequency range of the order of only 1.5 to 1. It is for this reason that it is preferred to employ the second alternative, i.e. to unbalance the two halves of the rotor.

Preferably when employing the aforesaid preferred alternative, the unbalance between the two halves of the rotor is obtained by earthing one of the halves.

Figure 2:
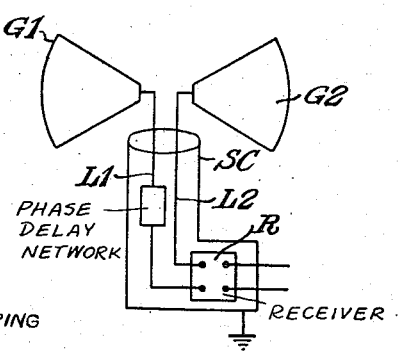
Figure 4:
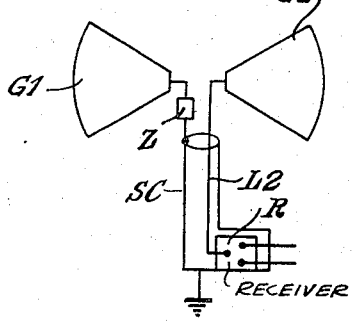
Figure 3:
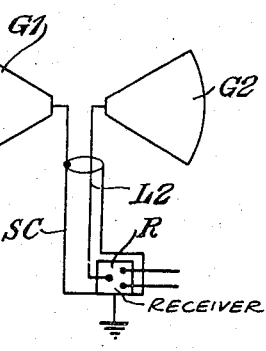

The invention is illustrated in and further explained in connection with the accompanying drawings which show four embodiments of my invention diagrammatically, Figures 1 and 2 illustrating typical embodiments wherein inserted phase delay means are employed to secure asymmetry of receiver input; and Figs. 3 and 4 showing embodiments wherein the radiogoniometer rotor is unbalanced for the same purpose. Figure 1 diagrammatically shows the aerials, the goniometer stator, the means for producing the datum or reference phase, and the phase responsive indicator; and Figs. 2, 3 and 4 show fragmentary portions of the circuit of Fig. 1 where the circuit components are arranged in differing circuit combinations.

Fig. 1 shows at G1, G2 the rotor of a radiogoniometer of the capacity type, the stator of which consists of four similar arcuate plates 51, 52, 53 and 54 lying on the surface of an imaginary cylinder and each insulated from its neighbor. The aerial system consists of two mutually perpendicular pairs of dipoles P1, P2, P3 and P4, the dipoles of each pair being separated by a distance of a little less than a quarter of a wave length. Each dipole is connected to its own one of the four stator plates by a "balance-to-unbalance" transformer of known type conventionally indicated at T1, T2, T3 and T4. The two halves of the rotor of the radiogoniometer are indicated diagrammatically at G1 and G2 and feed through leads L1 and L2 into the receiver R1. The connections to the radiogoniometer are only schematically shown. In practice, of course, slip rings would be used for connecting to the rotor. A phase delay network P is inserted in one of the leads as shown the lead L1. The rotor RG is rotated by a suitable electric motor M on the shaft of which is an electric generator conventionally indicated as consisting of a magnetic bar rotating between the poles of a magnet on which a coil is wound which provides a reference phase voltage. The receiver output will be a sinusoidal wave which will pass through zero at a point determined by the direction of the incoming signal. This output is fed as one input to any suitable known phase comparing circuit PC1 the other input of which is supplied from the reference phase voltage source. Accordingly, the output voltage from the phase comparing circuit will be representative of the incoming signal direction and may be fed to any suitable indicator I1.

Fig. 2 shows an arrangement generally similar to Fig. 1 the essential difference being that the leads, the delay network and the receiver are within an earthed screen SC.

Either of the arrangements of Figs. 1 and 2 may be modified by incorporating the delay circuit in the goniometer rotor itself instead of in an external lead from the rotor thereof. Thus, for example, the required phase delay may be obtained by providing a suitable length of co-axial cable within the goniometer rotor the inner wires of this length of co-axial cable being radially connected at one end of said length to one of the rotor plates and at the other end to the other. The actual length of cable inserted in the rotor is determined by the amount of phase delay required to produce a cardioid. A length of co-axial cable may also be used to provide the delay in the case in which the delay network is in an external lead from the rotor, a suitable loop of co-axial cable being inserted in said external lead.

Fig. 3 shows an embodiment in accordance with the preferred way of carrying out the invention and it will be at once seen that it is a good deal simpler than the arrangements of Figs. 1 and 2. There is no phase delay network. In Fig. 3 the two halves G1, G2 of the same goniometer rotor are put out of balance by the simple expedient of earthing one half (as shown the half G1) the other half (G2) being connected to the central conductor L2 of a co-axial feeder the outer conductor of which forms part of a screen SC to which G1 is connected and which is earthed. This simple arrangement is found to give very satisfactory results and, since there is no phase delay network, the undesired dependence of sensitivity upon working frequency is avoided.

Fig. 4 shows a further modification of the preferred type. This figure differs from Fig. 3 only by the insertion of an impedance Z between the earthed half G1 of the rotor and the screen or outer conductor SC. This impedance Z is not inserted in order to act as a delay impedance but in order to provide impedance adjustment for the reflected impedance which the rotor reflects into the aerial to which it is cyclically coupled.

The system of my invention is applicable to a multiple number of receivers with associated phase comparing circuits and indicators as shown in Fig. 1 by the additional receiver R2 connected with the phase comparing circuit PC2 which connects with the indicator I2. The phase comparing circuit PC2 connects with the output of the rotor RG of the radiogoniometer as shown.

It will be obvious that in Figs. 3 and 4 the screen SC acts as the second input lead to the receiver.

The invention has the advantage that it may be applied to a so-called multi-channel direction finder; that is to say, it may be used for the simultaneous indication of the directions of a number of different incoming signals of different frequencies. Thus, for example, the above described embodiments may be extended to handle a number of incoming signals simultaneously by providing a receiver, a phase comparing circuit and an indicator for each incoming signal frequency, each receiver being fed either from a common radiogoniometer rotor through its own phase delay network or from a common unbalanced radiogoniometer rotor and each phase comparing circuit receiving reference phase voltage input from a common source e.g. a generator on the goniometer rotor motor shaft. Instead of providing a separate delay network in each receiver input circuit as just stated there may be a common delay network in a part of a rotor output lead which is common to all the receivers and the correct individual phase delays may be obtained by providing additional small phase delay networks in a receiver input lead for each separate receiver or at any rate in a receiver input lead for each of the separate receivers except one. Phase delay networks for use in this invention may, of course, use valve isolator coupling means if necessary to maintain the balance of the aerial system as viewed from the incident wave.

I claim:

1. A radio direction finding system comprising two mutually perpendicular pairs of aerial elements; a radiogoniometer connected to said aerial elements and having a rotor; means for continuously rotating said rotor; at least one receiver; means for deriving from the radiogoniometer rotor an electrically unbalanced output; means to apply said output to the input of said receiver; means for producing an alternating voltage of reference phase synchronized with the rotation of said radiogoniometer; and an indicator responsive to the phase difference between the receiver output and the reference phase.

2. A radio direction finding system comprising two mutually perpendicular pairs of aerial elements; a radiogoniometer connected to said aerial elements and having a rotor; means for continuously rotating said rotor; at least one receiver; means for feeding said receiver from said radiogoniometer rotor with asymmetrical phase delay; means for producing an alternating voltage of reference phase synchronized with the rotation of said radiogoniometer; and an indicator responsive to the phase difference between the receiver output and the reference phase.

3. A radio direction finding system as set forth in claim 2 in which said means for feeding said receiver from said radiogoniometer comprises a two wire feed circuit between said radiogoniometer and said receiver and phase delay means inserted in one wire of said two wire feed circuit.

4. A radio direction finding system comprising two mutually perpendicular pairs of aerial elements; a radiogoniometer connected to said aerial elements and having an electrically unbalanced rotor; means for continuously rotating said rotor; at least one receiver fed from said unbalanced rotor; means for producing an alternating voltage of reference phase synchronized with the rotation of said radiogoniometer, and an indicator responsive to the phase difference between the receiver output and the reference phase.

5. A system according to claim 4 wherein the rotor is unbalanced by earthing one of the halves thereof.

6. A multi-channel radio direction finding system adapted to operate simultaneously on a plurality of operating frequencies and comprising a common pair of mutually perpendicular aerial elements; a common radiogoniometer connected to said pairs of aerial elements; a plurality of receivers, one for each of said operating frequencies; means providing asymmetrical outputs from said radiogoniometer to said receivers, one output to each receiver; a common means for producing an alternating voltage of reference phase; and a plurality of indicators, one for each of said operating frequencies, responsive to phase difference, each of said indicators being connected to respond to the phase difference between said reference phase and a different one of the receiver outputs.

7. A system according to claim 1 wherein the means for producing the alternating voltage of reference phase comprise a generator driven with the radiogoniometer rotor.

8. A system according to claim 2 wherein the means for producing the alternating voltage of reference phase comprise a generator driven with the radiogoniometer rotor.

9. A system according to claim 4 wherein the means for producing the alternating voltage of reference phase comprise a generator driven with the common radiogoniometer rotor.

References Cited in the file of this patent

UNITED STATES PATENTS

| | | |
|---|---|---|
| 1,449,253 | Strock | Mar. 20, 1923 |
| 1,460,801 | Marriott | July 3, 1923 |
| 1,723,907 | Alexanderson | Aug. 6, 1929 |
| 1,820,647 | Brown | Aug. 25, 1931 |
| 2,223,547 | Burrill | Dec. 3, 1940 |

FOREIGN PATENTS

| | | |
|---|---|---|
| 221,752 | Switzerland | Sept. 1, 1942 |